United States Patent [19]
Hoffman

[11] Patent Number: 5,147,486
[45] Date of Patent: Sep. 15, 1992

[54] BUILDING PLYWOOD PRODUCT AND METHOD

[75] Inventor: Harry O. Hoffman, 4411 YakataDoro Dr., Youngstown, Ohio 44511

[73] Assignees: Harry O. Hoffman; Kathleen A. Hoffman, Youngstown, Ohio

[21] Appl. No.: 620,143

[22] Filed: Nov. 30, 1990

Related U.S. Application Data

[62] Division of Ser. No. 324,611, Mar. 17, 1989, Pat. No. 5,071,688.

[51] Int. Cl.$^5$ .............................................. B27D 1/04
[52] U.S. Cl. .................................. 156/154; 144/346; 428/106; 428/114
[58] Field of Search ............... 144/332, 330, 351, 346; 156/154, 94; 428/106, 535, 537.1, 114; 52/311, 312, 313

[56]  References Cited

U.S. PATENT DOCUMENTS

| | | | |
|---|---|---|---|
| 2,720,478 | 10/1955 | Hogg | 156/154 |
| 3,362,379 | 1/1968 | Knudtson | 118/670 |
| 3,595,203 | 7/1971 | Fabulich | 118/415 |
| 3,618,646 | 11/1971 | Lewis | 144/352 |
| 3,769,143 | 10/1973 | Kulesza | 156/154 |
| 3,807,351 | 4/1974 | Tuberman | 118/410 |
| 3,967,581 | 7/1976 | Zirbel | 118/684 |
| 4,105,816 | 8/1978 | Hori | 427/428 |
| 4,114,233 | 9/1978 | Hamilton | 16/95 R |
| 4,971,537 | 11/1990 | Hoffman et al. | 156/94 |

FOREIGN PATENT DOCUMENTS

| | | | |
|---|---|---|---|
| 55-44685 | 11/1980 | Japan | 156/154 |
| 62-28204 | 2/1987 | Japan | 144/332 |

OTHER PUBLICATIONS

American Plywood Association Product Guide, Form No. B360F/Revised May 1988/4000.
"U.S. Product Standard PS 1-83", American Plywood Association, Form No. 1t850 c/Revised Jun. 1987/6000.
Prosales, for Dealers and Distributors Serving the Professional Contractor, "The Second Coming of Engineered Trim" pp. 56-57, Mar. 1991.

Primary Examiner—Michael W. Ball
Assistant Examiner—Daniel J. Stemmer
Attorney, Agent, or Firm—Clifford A. Poff

[57]  ABSTRACT

The disclosure relates to a medium density overlay plywood panel used as an exterior trim product for a residential building having a relatively high number of plies to total board thickness, and exposed edges with void free sanded surfaces having a predetermined pattern coarseness, and in which said overlay and edge surfaces are covered with an acrylic paint, whereby the trim product is characterized with the appearance of a solid wood product and the painted surfaces as highly weather resistant.

11 Claims, 2 Drawing Sheets

BUILDING PLYWOOD PRODUCT AND METHOD

The present application is a divisional application of U.S. Ser. No. 07/324,611, filed on Mar. 17, 1989, now U.S. Pat. No. 5,071,688.

BACKGROUND OF THE INVENTION

The present invention pertains to a method of producing a plywood product and the product itself used for certain applications in the residential and commercial building industries, and more particularly as a trim and/or wall covering product for either exterior or interior use.

For the purpose of explaining the invention, its adaptation for use as an exterior wood trim product has been selected for domestic structures (homes) since at present it is the preferred application.

It has been almost exclusively the practice of architects and builders to employ solid wood, for exterior trim members, such as redwood and cedar for example, the trim being placed around doors, windows, wall sections, overhangs, soffits, etc. mostly for accent or to give a "finishing touch" to the homes.

The selection in the past of the solid types of woods was mainly done because of the desire to achieve a solid wood appearance, notwithstanding the inherent serious disadvantage of upkeep, in that such woods required repeated painting or staining and were subject to the ever constant problems of peeling, flaking and cracking. The disadvantages of these solid wood products were exacerbated by the continuous rise in cost of the wood involved, particularly due to the increase scarcity of cedar and redwood.

While the attempts to employ a plywood product in place of the solid wood was attractive due to the obvious substantial cost saving, plywood trim was not well received. This was due mainly because of the failure to give the appearance that the trim was a solid wood product, particularly as to the edges where not only the several plies were visible but also the customary edge openings could not be adequately filled and covered with paint or stain. This disadvantage when considered along with the fact that the plywood trim from a maintenance standpoint was no better, if not worse, than the solid wood trims led to a rejection of the plywood trim product.

Despite the failure of these earlier attempts to satisfy the industry's needs for an acceptable plywood trim product, because of the substantial cost saving it represented, the present invention sought to overcome each of the above mentioned drawbacks and others, and in fact has been successful in doing so.

This solution started with the recognition of selecting as the base plywood product a plywood generally similar to the type already on the market for other industrial uses, howbeit not for a trim product, such a product is manufactured and sold by Simpson Timber Company of Shelton Washington and marketed under the registered Trademark "Two Step" MDO, MDO being an acronym for a plywood base panel having a medium density overlay on one or both of its planar surfaces and employing a marine plywood type adhesive. A discussion of this product can be found in the American Plywood Association's brochure, Form No. B360F/Revised May 1988/4000. This product in the form employed by the present invention is known sometimes as a scarfed jointed panel, which is discussed and illustrated, along with other pertinent characteristics of the base plywood panel in a publication of the American Plywood Association entitled "U.S. Product Standard PS 1-83" Form No. H 850C/Revised, June 1987/6000. The term density refers to the amount of resin in the overlay, the resin being used for proper coating adhesives and the high content for moisture resistance.

The multi-step product generally is made by the selection of Douglas fir plies to form the substrate in a conventional manner, repairing any surface defects, sanding one or both of the planar surfaces and then covering these surfaces with a resin impregnated overlay by a hot pressing operation. This product is characterized by having a planar smooth surface, a surface that holds paint extremely well and a plywood substrate with a minimum of core gaps.

Such a product while having some very attractive features as a potential base board as a trim, still presented the problem of not giving the requisite solid wood appearance, particularly as to the ply edges on the long sides of the panel and even if the edge problem could be solved, there was no acceptable manner of being able to apply a paint, glaze or stain that would assure that both the planar surface and the edges would give the appearance of being a solid piece of wood and that both portions would yield a uniform maintenance free product.

BRIEF SUMMARY OF THE INVENTION

Against the above described backdrop, the present invention provides a method of producing a plywood product and the product thereof characterized by a relatively high number of plies to total board thickness to minimize core gaps, having one planar sanded surface with a medium density overlay, where the otherwise core gaps and other imperfections of the edges have been treated, and the intended exposed surface and edges have been coated to give the unquestionable appearance of a solid wood board, and when used for external application possesses a maintenance free quality much superior to existing solid wood trim products.

More, particularly the invention provides an article of manufacture comprising a plywood building trim product consisting of between five to eleven plies having a ratio of five plies per five eighth inch of total board thickness and an approximately similar ratio for increase thicknesses of boards and having Douglas fir for the wood and the ply adherent being a marine glue, the article being further made up of two or more end to end lengths of said boards joined together by a transverse diagonal scarfed joint, forming a relatively long length narrow width trim product, the thickness difference between said two joined boards in the area of said joined ends being limited to no more than approximately one thirty second of an inch, said trim product having an appearance side, an opposite construction side and two opposite long length exposed ply edges, said appearance side being covered entirely by a medium density fiber overlay, said ply edges being characterized by void free sanded surfaces formed by applying a void filler putty, and post filler sanding, the sanded surfaces being characterized by having a predetermined coarseness pattern of the order of 40 to 60 grit and an overall coarseness comprising alternate plies having different degrees of coarseness for purposes of good coating adherence, said appearance side and said ply edges being covered by an acrylic paint, wherein said appearance side and said ply edges are characterized by high resistance against conditions affecting appearance and longevity, and having the appearance as to said painted surfaces of a solid integral wood trim product.

DETAIL DESCRIPTION OF THE INVENTION

As noted previously, the preferred base plywood panel, based on what is presently available on the market, is a structural 1 multi-step MDO, of the type offered to the trade by the Simpson Timber Company, in which to make the required lengths two boards that make up the panel are joined by a scarfed joint such as depicted on page 31 of the aforesaid American Plywood Association's publication of June 1987/6000. This type of joint is important to the product of the present invention because all of the thickness differential between the two boards can be taken up on common sides of the boards opposite the overlay sides so that the overlay sides can be made substantially flat, i.e. there being no gap or space between adjacent surfaces of the boards and no thickness differences, which surfaces when covered by the overlay assure an extremely flat appearing face.

Just as important to the present invention is the selection of a plywood generally similar to the MDO Douglas fir product because it may be constructed to have a preferred limited and tight core gap condition per a given thickness of panel along with the high structural qualities. Equally important is the advantage given by the medium density overlay as a superior smooth paintable long lasting surface because, in part, of its pre sanding operation resulting in a minimum of wood grain and repair show-throughs. The medium density overlay while available in a number of different weights, for the purpose of the present invention 61 lbs/M sq. ft. 28–38% resin is preferred of the impregnated cellulose fiber type applied by heat and pressure. As noted above, these characteristics and others of the MDO products as manufactured by the Simpson Timber Company are discussed in the aforesaid publication Form No. B 360 F.

This plywood product employs a well known marine plywood glue.

For present day exterior trim, the multi-step MDO panel according to the present invention is cut from a standard 4 ft. width, 8 to 12 feet long panel to the required narrow widths of approximately between 3 to 12 inches and between ⅝ to 1¼ inches in thickness depending on the particular end use. The ⅝ inch thickness board would preferably be a 7 ply board, 9 ply for a ¾ inch board, 11 ply for a 1 inch thickness board and 13 ply for the 1¼ inch board.

One of the important aspects of the invention is the development of the above described cut MDO product into a trim that will give the appearance of a solid wood board, in which the longitudinal edges, in particular, are made to look like solid wood and both the overlay surface and the longitudinal edges when painted or stained will give the appearance of three identical exposed surfaces, which will be far superior from a maintenance standpoint than existing trim products for a wide range of different outdoor regions and conditions.

Figure 1:
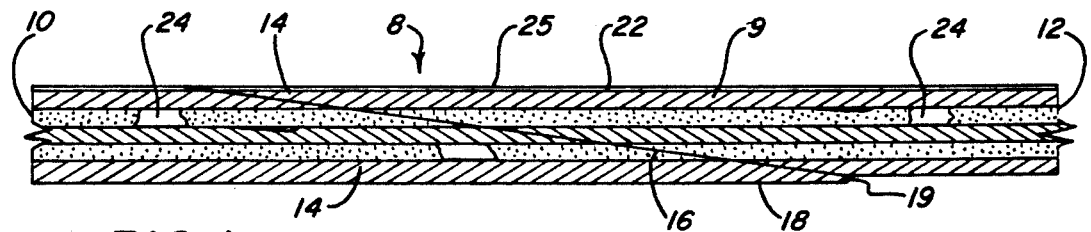
FIG. 1 thru FIG. 4 are similar sequence views of one of the longitudinal edge surfaces of a trim product for the purpose of illustrating the conditions of the edge surface at various stages of the treatment thereof in producing a plywood trim product in accordance with the teaching of the present invention.

With reference now to FIG. 1, which is the first of four sequential views of a portion of one of the longitudinal sides or edge surfaces of a 5 ply Douglas fir multi-step scarf jointed thin core MDO plywood trim of the type described above, before the side has been treated in accordance with the teaching of the present invention. The plies have generally equally approximately 0.09 inch thicknesses, as shown in FIG. 1. As one views FIG. 5, it is to be understood that the top and two opposite long sides or edges 9, will be treated portions of the trim and the short sides or edges and the bottom surface will remain untreated. The trim 8, as viewed from one of its edge surfaces 9, comprising of two end to end boards 10 and 12 constructed according to customary practice of five plies 14, the left hand end 10 being joined to the right end 12 by a well known scarfed joint 16, in a manner that any thickness differential is made to appear all at the lower surface 18, at the location 19, which will be the non exposed i.e. construction side of the finished trim. The thickness difference between the two joined products in the area of the joined ends is limited to no more than approximately plus or minus one thirty second of an inch. Those skilled in the art will appreciate the trim need not be made up of two or more boards and that if joined, the joint need not be a scarfed joint, but a fingered or other type of joint can be employed.

To the top surface 25 of the trim 8 there is formed the medium density overlay 22 of the type previously discussed. Also shown in FIG. 1 are several of the customary edge imperfections in the form of irregular openings 24, which may range in depth or extent from a mere surface indentation to a opening clear through the board. Not shown, is the full extent of the core gaps which exist between each adjacent surface or layer of the plies 14, which gaps require treatment as do the openings 24, if the objectives of the present invention are to be realized.

Figure 2:
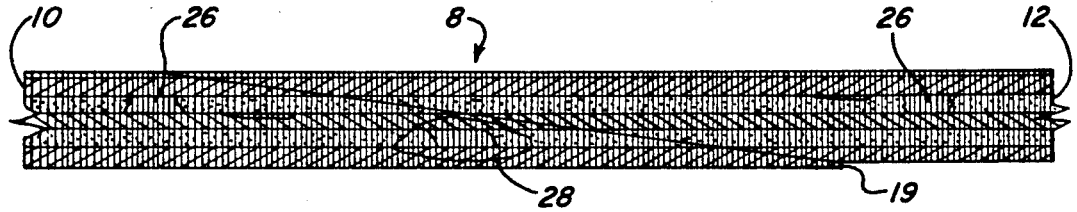

Turning now to FIG. 2, where like references indicate similar elements, as is true in the remaining views, this sequential view is designed to depict the improved condition of the edges of the trim board after it has been treated with a void filling substance 26 as the first step of the invention to create a solid wood like trim product. In the preferred form of the invention, the filler substance takes the form of a wood putty water base similar to 120 spackling paste sold by the Synkoloid Company, Inc. of Atlanta, Ga. under its trade name "SYNKO". Important factors in selecting the filler is the technic employed to effectively apply the filler and how the filler holds up after drying and cooling. Some fillers were found to not fill the voids satisfactory, particularly when applied to a vertical surface, others which acceptably filled the gaps, upon drying formed "dimples" or "mud cracks". The putty found most acceptable was one that contained relatively high solids, for example, approximately 70% solids in which the solids, consisted substantially of resins but yet had the necessary viscosity for effective application and flexibility, i.e., resilience when dried. Because of the need to balance these various factors it was found that the maintenance of the temperature of the putty was important.

In this regard it is desirable that the putty be maintained at a temperature so as not to fall below approximately 60° F. and preferably at approximately between 60° and 80° F. Depending on the type and contents of the putty, the conditions of the edges and the ambient conditions of the manufacturing plant, the viscosity of the putty may vary substantially.

FIG. 2 is designed to indicate that the putty has completely filled any and all openings, including the core gaps and the scarfed joint, wherein the entire surface, in addition to the openings and gaps, is covered with a relatively thin uniform coating of the putty. In this covering and filling it will not be necessary to completely fill the extensive openings and only necessary to provide enough filling to assure a smooth flat edge surface. Such openings, however, may have an overage of putty tending to protrude outwardly from the other portions of the covered edge surface, the former condition being depicted by the area marked 28.

In addition to a putty filler which could be either a water or solvent base product, depending on the weather conditions with which the trim is to be used and the machinery employed, if any, to apply the filler and commercial consideration, the filler may be one of several available caulking compounds, or one of the wood filler products now on the market when altered, if necessary, to fit the particular purpose. While the filler can be applied by hand, in which case a less liquid type product can be used, the preferred manner is by mechanical means where both edges of the trim are treated at the same time.

Figure 3:
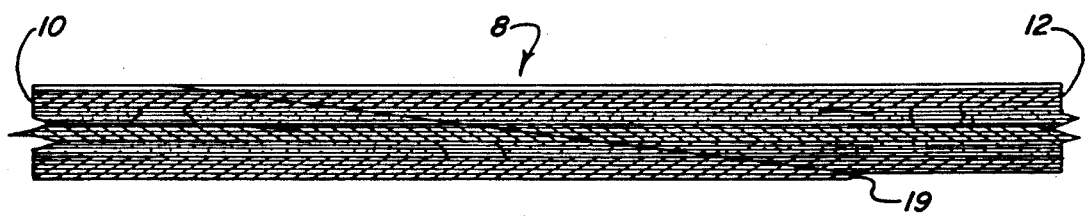

In the third sequential view shown in FIG. 3, the putty treated edge of the trim 8 has been given a smoothing treatment such as by sanding, the preferred treatment being a sanding treatment, in which both opposite edge surfaces of the trim are subject to a sanding operation such as by dual edge sanding machine. This treatment is preferred after the filler has been dried either by allowing it to dry naturally or by applying heat in a controlled manner.

It is important according to the present invention in the sanding or similar treatment to create a teeth condition i.e. a controlled desired degree of roughness throughout the entire edge surface for the purpose of assuring a good bonding surface for a surface coating. In the development of the invention two factors were found to be significant, the first was the recognition that the alternate plies that make up the board and appear at both the long and short edges or sides of the product and particularly the edge 9 and its opposite edge. In this arrangement, one ply is the "end" cross ply and the other the "edge" cross ply which create alternate different teeth conditions across the edge 9 and its opposite edge of the product from ply to ply, and secondly that depending on the coarseness effected by the sanding operation an excellent bonding surface could be obtained. This alternate teeth condition creates a highly desirable surface pattern due to the reaction of the end grain and the edge grain when subject to a certain sanding operation. A sand paper belt may be employed having a coarseness range of number 40 to 60 grit, preferably number 50 grit, the grit being the amount and texture of the sand on the paper.

Figure 4:
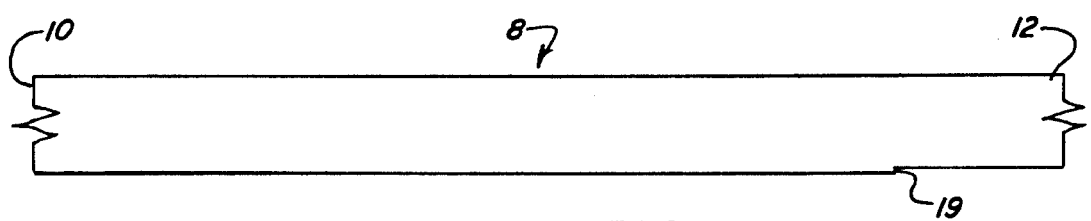

With reference now to the fourth sequential view shown in FIG. 4, the sanded edge surface of FIG. 3 has been treated with a sealer primer of paint or stain and if desired a second or finished coat, each coat being an approximately 2½ to 3 mils wet coat. This step in producing an acceptable trim product requires care in selecting the correct type or kind of sealer in terms of achieving the solid board appearance and assuring a superior maintenance free product. In this regard as to the selection of a paint, a paint of the industrial machine applied acrylic latex type is preferred. The paint should have a medium solid content by volume and evidence good adhesive qualities when subject to an adhesive tape test immediately after wet painting and oven drying, one such paint being that sold by the Perry and Derrick Company of Cincinnati, Ohio as its 87382 Latex Primer.

Figure 5:
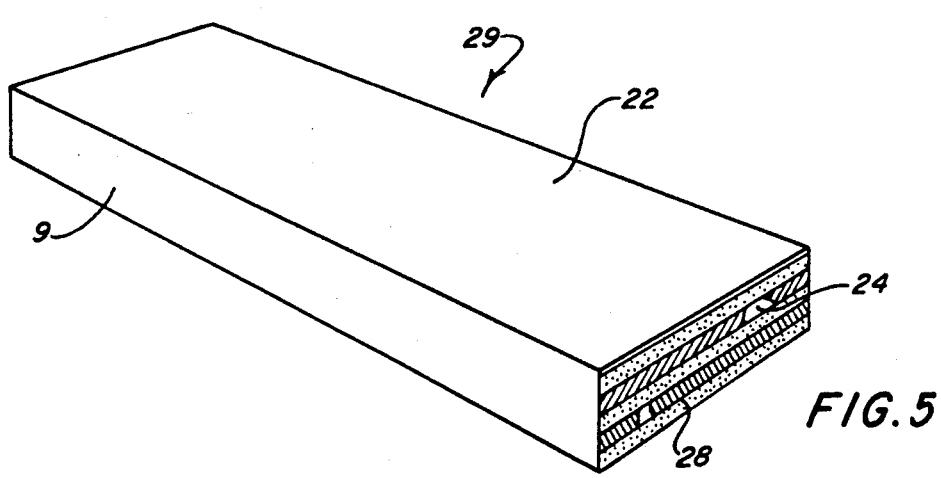
FIG. 5 is a perspective view of a portion of a finished external plywood trim product corresponding to FIG. 4.

FIG. 5 is designed to illustrate the finished trim product 29, in which one of the two finished exposed edges 9 and the exposed finished overlay side 22 are shown, in addition to one of the non-exposed untreated ends 28, non-exposed in the sense that when secured to the house the end is covered by another part of the building. The treated portions constituting a plywood product have been made to appear as a solid wood product for the purpose intended.

Figure 6:
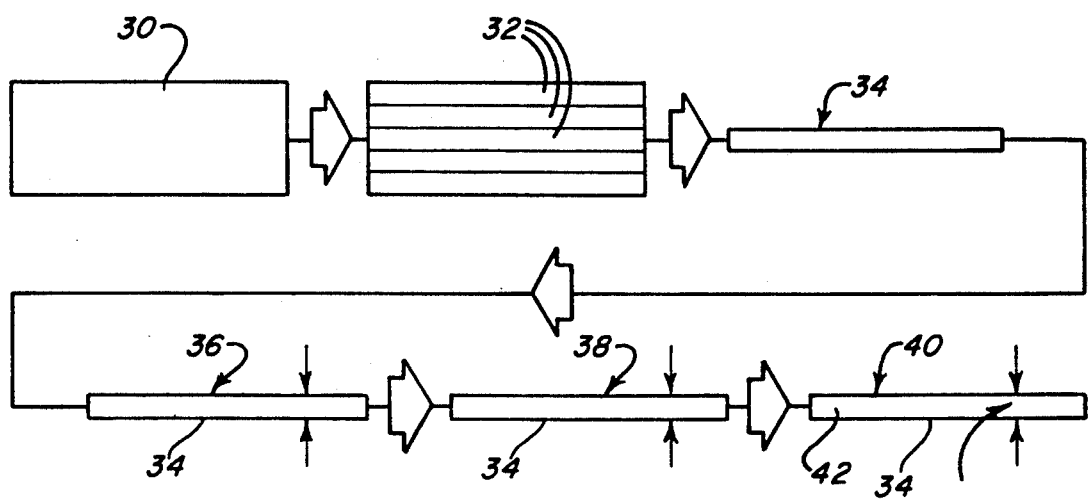
FIG. 6 is a layout plan view for the purpose of illustrating the sequential method steps of the present invention.

With reference to FIG. 6, which illustrates the method steps of the present invention, there is indicated a multi-step MDO panel 30 of the type above described, as being the basic plywood product from which the final trim is formed. This panel 30 is cut into a number of narrower width full length trim boards 32, such as previously noted, one of such trim boards being identified at 34. This trim board is then transferred to a putty station 36 where the long opposite edge surfaces 38 are passed between opposed putty applicators, as indicated by the two opposed arrows, to simultaneously apply putty to all openings, including the core gaps as described above.

From the putty station 36, the partially processed trim board 34 is passed to a sanding station 38 where the two puttied edge surfaces are simultaneously sanded by being passed between two opposed sanding devices indicated by opposed arrows, to remove any excessive putty and create a uniform surface and a uniform predetermined coarseness, i.e. the teeth condition as previously explained.

From the sanding station 38, the trim board 34 is transferred to a paint station 40 where paint is applied simultaneously to both of the two previously treated edge surfaces and the overlay top surface 42, as indicated by three arrows. As explained above, a second coat may be applied, if desired, in which each coat will be of the approximate order of 2½ to 3 wet mils per coat. This last step, with the benefit of the earlier steps, creates a plywood board having the appearance, as to the three treated surfaces, of a solid wood trim product possessing all of the other desired characteristics previously noted.

In accordance with the patent statutes, I have explained my invention in terms of its preferred embodiment, however, it will be readily understood by those skilled in the art to which the invention pertains that it may be practiced other than illustrated and described.

I claim:

1. A method of manufacturing an exterior plywood building trim product comprising the steps of:
    forming a base plywood board of an odd number of plies between 7 to 13 inclusive, said board having a ratio of 7 plies per five-eights inch of total board thickness and an approximately equal ratio for increased thicknesses of boards, by:

arranging each ply so that its grain is positioned perpendicularly to an adjacent ply to form alternately arranged plies having alternating degrees of edge coarseness, forming the board to have appearance and construction side plies and interior plies, providing said interior plies so that each ply thereof has substantially the same uniform thickness, adhering adjacent said plies together, forming the board to have a length substantially greater than its width, and to have two exposed ply edges opposite each other extending the length of the board, wherein said ply edges will have edge openings and edge core gaps;

sanding said appearance side ply to reduce show-through imperfections;

covering said appearance side ply with a fiber overlay;

filling said edge openings and edge core gaps with a filler compound to fill at least the outside portions of said openings and gaps and to cover the entire surfaces of said ply edges to an extent sufficient only to create substantially uniformly covered edges;

sanding said covered edges so that the sanded edges have a predetermined degree of overall coarseness created by said sanding, wherein the coarse sanding and said different degrees of edge coarseness of said alternately arranged plies form a strong bond between said ply edges and a covering of paint or stain; and covering said sanded edges and said covered appearance side ply with paint or stain, wherein said appearance side ply and said ply edges are substantially resistant to conditions affecting appearance and longevity and have the appearance as to said covered edges and appearance side ply of a solid integral wood product.

2. In a method according to claim 1, the additional step of immediately prior to applying said void filling compound maintaining said compound at a temperature so as not to fall below approximately 60° F.

3. In a method according to claim 1, the additional step of immediately prior to applying said void filling compound maintaining the compound at a temperature between approximately 60° to 80° F.

4. In a method according to claim 1, wherein said void filling compound comprises a wood putty having as an ingredient a substantial amount of solids and when dried has a high resistance to dimpling and mud cracks.

5. In a method according to claim 1, said sanding step further comprising creating a coarseness of the order of number 40 to 60 grit.

6. In a method according to claim 1, the additional step of forming said interior plies out of plies having a thickness of approximately 0.09 inch.

7. A method of manufacturing an exterior plywood building trim product comprising the steps of:

forming at least two base plywood boards of an odd number of plies between seven to thirteen inclusive, said boards having a ratio of seven plies per five eights inch of total board thickness and an approximately equal ratio for increased thicknesses of boards, wherein each board has the same number of plies, by:

arranging each ply so that its grain is positioned perpendicularly to an adjacent ply to form alternately arranged plies having alternating degrees of edge coarseness, forming the board to have appearance and construction side plies and interior plies, forming said interior plies so that each ply thereof has substantially the same uniform thickness, and forming the plies out of Douglas fir, adhering adjacent said plies together by a marine glue joining together two or more end to end lengths of said boards by a transverse diagonal scarfed joint to form a length substantially greater than the width of the joined boards, wherein the joined boards will have two exposed ply edges opposite each other extending the length of the joined boards, and wherein said ply edges will have edge openings and edge core gaps;

limiting the thickness difference between the joined boards in the area of said joined ends to no more than approximately plus or minus one thirty second of an inch;

forming said appearance side ply and said construction side ply having the same grain directions;

sanding said appearance side ply to reduce show-through imperfections;

covering said appearance side ply with a medium density fiber overlay;

filling said edge openings and edge core gaps with a filler compound to fill at least the outside portions of said openings and gaps and to cover the entire surfaces of said ply edges to an extent sufficient only to create substantially uniformly covered edges;

sanding said covered edges to give the sanded edges a predetermined coarseness of the order of number 40 to 60 grit, wherein the coarse sanding and said different degrees of edge coarseness of said alternately arranged plies form a strong bonding surface for purposes of good coating adherence; and covering said sanded edges and said covered appearance side ply with an acrylic latex paint coating, wherein said covered appearance side ply and said ply edges are substantially resistant against conditions affecting appearance and longevity, and have the appearance as to said painted surfaces of a solid integral wood trim product.

8. In a method according to claim 7, the additional step of immediately prior to applying said putty maintaining said putty at a temperature so as not to fall below approximately 60° F.

9. In a method according to claim 7, wherein said putty comprises a wood putty having as an ingredient a substantial amount of solids and when dried has a high resistance to dimpling and mud cracks.

10. In a method according to claim 7, the additional step of forming said interior plies out of plies having a thickness of approximately 0.09 inch.

11. In a method according to claim 7, the additional steps of arranging, for several different thickness building trim products, seven said plies to form a five-eighths inch total thickness said board, nine said plies to form a three quarter inch total thickness said board, eleven said plies to form a one inch total thickness said board, and thirteen said plies to form a one and a quarter inch total thickness said board.

* * * * *